(12) United States Patent
Erdmann et al.

(10) Patent No.: US 9,948,504 B2
(45) Date of Patent: Apr. 17, 2018

(54) METHOD FOR CONFIGURING A NODE

(75) Inventors: Bozena Erdmann, Aachen (DE); Ludovicus Marinus Gerardus Maria Tolhuizen, Waalre (NL); Armand Michel Marie Lelkens, Heerlen (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 724 days.

(21) Appl. No.: 14/131,467

(22) PCT Filed: Jul. 4, 2012

(86) PCT No.: PCT/IB2012/053395
§ 371 (c)(1),
(2), (4) Date: Jan. 8, 2014

(87) PCT Pub. No.: WO2013/008136
PCT Pub. Date: Jan. 17, 2013

(65) Prior Publication Data
US 2014/0115132 A1   Apr. 24, 2014

Related U.S. Application Data

(60) Provisional application No. 61/506,327, filed on Jul. 11, 2011.

(30) Foreign Application Priority Data

Jul. 11, 2011 (EP) .................................. 11305900

(51) Int. Cl.
*G06F 15/177* (2006.01)
*H04L 12/24* (2006.01)
(Continued)

(52) U.S. Cl.
CPC ......... *H04L 41/0803* (2013.01); *H04W 24/02* (2013.01); *H04W 52/02* (2013.01); *H04W 28/18* (2013.01); *H04W 88/06* (2013.01)

(58) Field of Classification Search
CPC .......... H04L 41/0803; H04L 41/0813; H04W 24/02; H04W 52/02; H04W 28/18
(Continued)

(56) References Cited

U.S. PATENT DOCUMENTS 6,094,600 A * 7/2000 Sharpe, Jr. ......... G05B 19/0423
                                                    700/19
6,363,267 B1 * 3/2002 Lindskog .......... H04W 52/0216
                                                    340/7.32
(Continued)

FOREIGN PATENT DOCUMENTS

JP    2009088750 A    4/2009
JP    2010515110 A    5/2010
(Continued)

OTHER PUBLICATIONS

Zigbee Alliance: Zigbee Specification 2007, Chapter 3.6, Internet Citation, Jan. 17, 2008, pp. 347-417, XP002542076.

*Primary Examiner* — James E Springer
(74) *Attorney, Agent, or Firm* — Meenakshy Chakravorty

(57) ABSTRACT

This invention relates to a method for configuring a limited node in a network, said limited node being able to receive data only within limited reception opportunities, the method comprising at a first node: (a) detecting that an update of a network configuration parameter value for the limited node is required; (b) deciding on whether to change a limited node behavior from a first behavior based at least partly on communication characteristics of the limited node, said change of behavior including increasing reception opportunity at the limited node; (c) depending on decision at step (b), triggering delivery of a request of behavior change to the limited node during a first reception opportunity; (d) triggering delivery of the updated network configuration param-
(Continued)

eter value to the limited node during a second reception opportunity of the limited node.

20 Claims, 3 Drawing Sheets

(51) Int. Cl.
*H04W 52/02* (2009.01)
*H04W 24/02* (2009.01)
*H04W 28/18* (2009.01)
*H04W 88/06* (2009.01)

(58) Field of Classification Search
USPC .......................................................... 709/222
See application file for complete search history.

(56) References Cited

U.S. PATENT DOCUMENTS

| | | | | |
|---|---|---|---|---|
| 2003/0004952 | A1* | 1/2003 | Nixon | G05B 19/4145 |
| 2004/0215755 | A1* | 10/2004 | O'Neill | G06F 8/65 709/223 |
| 2006/0123080 | A1* | 6/2006 | Baudino | H04L 67/306 709/204 |
| 2006/0165031 | A1* | 7/2006 | Wang | H04W 52/02 370/328 |
| 2007/0136098 | A1* | 6/2007 | Smythe | A61N 1/37264 705/3 |
| 2007/0183355 | A1* | 8/2007 | Kuchibhotla | H04W 52/0245 370/318 |
| 2008/0002647 | A1* | 1/2008 | Laroia | H04W 40/244 370/338 |
| 2008/0077707 | A1* | 3/2008 | Ferguson | G06F 17/30176 709/238 |
| 2008/0215664 | A1* | 9/2008 | Dibbern | H04L 67/14 709/202 |
| 2008/0307509 | A1* | 12/2008 | Kim | H04L 12/24 726/4 |
| 2009/0132698 | A1* | 5/2009 | Barnhill, Jr. | H04L 12/2809 709/224 |
| 2009/0328027 | A1* | 12/2009 | Tsuchiya | G06F 8/65 717/171 |
| 2010/0106836 | A1* | 4/2010 | Schreyer | G06F 9/542 709/226 |
| 2010/0144312 | A1* | 6/2010 | Runstedler | H04M 15/00 455/407 |
| 2010/0161982 | A1* | 6/2010 | Oh et al. | H04L 9/083 713/168 |
| 2010/0293363 | A1* | 11/2010 | Meyer | G05B 19/0426 713/1 |
| 2011/0002343 | A1* | 1/2011 | Dacosta | H04L 29/06027 370/428 |
| 2011/0019621 | A1* | 1/2011 | Funk | G01D 21/00 370/328 |
| 2011/0038291 | A1* | 2/2011 | Seok | H04W 52/0235 370/311 |
| 2011/0070921 | A1* | 3/2011 | Karaoguz | H04L 41/0843 455/552.1 |
| 2011/0173435 | A1* | 7/2011 | Liu | H04L 63/061 713/150 |
| 2011/0176418 | A1* | 7/2011 | Gershinsky | H04L 47/12 370/230.1 |
| 2011/0307882 | A1* | 12/2011 | Shiba | G06F 8/65 717/173 |
| 2012/0020271 | A1* | 1/2012 | Josiam | H04L 5/001 370/312 |
| 2012/0290531 | A1* | 11/2012 | Kallakuri | G06F 17/30575 707/610 |
| 2013/0010631 | A1* | 1/2013 | Jung | H04W 24/10 370/252 |
| 2013/0252643 | A1* | 9/2013 | Park | H04W 8/24 455/458 |

FOREIGN PATENT DOCUMENTS

| | | |
|---|---|---|
| JP | 2011030053 A | 2/2011 |
| WO | 2011055292 A1 | 5/2011 |
| WO | 2011070479 A1 | 6/2011 |

\* cited by examiner

| Octets | 1 |
|---|---|
| Data type | 8-bit bitmap |
| Field Name | Options |

FIG 3A

| Bits: 0 | 1 | 2 | 3-4 | 5 | 6 | 7 |
|---|---|---|---|---|---|---|
| Enter/Exit Mode | Extend Rx Window | Increase Reporting Frequency | ACK Required | Enable Channel Toggling Behavior | Enter Commissioning Mode | Use Special Command For Tx |

FIG 3B

METHOD FOR CONFIGURING A NODE

FIELD OF THE INVENTION

The present invention relates to a method for configuring a network, to a maintenance entity and to a communication network comprising the maintenance entity and a plurality of nodes.

This invention is, for example, relevant for wireless networks where some of the nodes that need to be configured have some strong operational limitations, like only limited and unpredictable reception time windows. This is in particular the case for ZigBee Green Power Devices inside ZigBee networks.

BACKGROUND OF THE INVENTION

In a network, in particular in a wireless network, it is required to keep every node updated with the currently used value of network configuration parameters to maintain a correct operation for each node of the network. Indeed, it is possible that, due to unscheduled events, like a change in the interference spectrum or location, or due to scheduled events, like a periodic change of a cryptographic key, a maintenance entity needs to communicate a new value for a network configuration parameter, like a channel identifier, a network identifier, a node identifier or role, an identifier of a new coordinator/maintenance entity inside the network, a cryptographic key, a key descriptor or a key seed.

However, in some networks, there can be some nodes that are limited in terms of reception opportunities. As an illustration, in a ZigBee network, there may be ZigBee Green Power Devices (ZGPDs), which harvest the energy from their environment or have very limited battery and thus unpredictable receiving behaviour. For example, a ZGPD can be a battery-less switch with electro-mechanical energy harvester that can only receive for a short time once it is actuated by a user and has transmitted its signal. Another example of a ZGPD is a periodically-reporting sensor, harvesting energy from its environment, e.g. by means of a photovoltaic cell. However, the presence in the environment of this energy is not predictable and the sensor may not be able to report anymore for a period of time. Because of their energy budget limitations, those devices are also not able to discover the new parameters via an active search.

Given that these devices cannot receive a configuration signal at each point in time, if a reconfiguration of the network occurs in the interval between two reception opportunities of a limited device, this limited device would be unaware of the change in the parameter value.
This is likely to cause the limited device to be excluded from the network, since it would still use the previous version of the network parameters and thus its messages are likely not to be received, or if received—likely to be dropped—by its communication peers which have been updated. For the limited device to be reintegrated in the network, it requires a special process which is very likely to require manual intervention from the user, can be long and is thus a large maintenance burden.

Moreover, the duration of the reception opportunities in operation may be very short, in particular after transmission of data packets. For example, a ZigBee Green Power Device indicates the reception capability in the regular frame it sends (upon user/sensor/application trigger), by setting an RxAfterTx flag. 5 ms after this transmission, the ZGPD opens its radio for reception, for at least 0.576 ms, corresponding to the shortest Green Power Device Frame. This duration is not sufficient e.g. to receive a packet containing a new key.

SUMMARY OF THE INVENTION

It is an object of the invention to propose a method which alleviates the above identified problems.

It is another object of the invention to propose a method for communicating with a limited node which enables to keep the maintenance of such limited nodes up to date.

It is another object of the invention to propose a method which facilitates the operation of a network comprising limited nodes and where some parameters need to be set dynamically.

By limited node, it is meant a node with restricted capabilities for transmission and/or reception. One illustrative example is an energy-harvesting device, like a switch or a sensor, which can communicate only for reduced and sometimes unpredictable amount of time after being energized. Another example is a device transmitting/receiving only on application trigger, e.g. when a particular value is sensed. More examples will be illustrated in the detailed description of the invention.

To reach the above mentioned objects, in accordance with a first aspect of the invention, a method is proposed for configuring a limited node in a network, said limited node being able to receive data only within limited reception opportunities, the method comprising at a first node:

(a) detecting that an update of a network configuration parameter value for the limited node is required;

(b) deciding on whether to change a limited node behaviour from a first behaviour based at least partly on communication characteristics of the limited node, said change of behaviour including increasing reception opportunity at the limited node;

(c) depending on decision at step (b), triggering delivery of a request of behaviour change to the limited node during a first reception opportunity of the limited node (d) triggering delivery of the updated network configuration parameter value to the limited node during a second reception opportunity of the limited node. As a consequence, the configuration of a limited node during operation is enabled through this method. This invention is based on the recognition that the normal operation of such limited node is likely to endanger or slow down the configuration of the limited node. Some consequences of the limited node not to be updated in time include the impossibility for this limited node to be understood by its neighbours. This would require intervention of an operator to detect and reconfigure the node. This automatic reconfiguration would avoid such intervention.

In accordance with a second aspect of the invention, the present invention also relates to a method for configuring a network, said network comprising a maintenance entity and a plurality of nodes, the method comprising the steps of:

at the maintenance entity, (1a) detecting a potential presence in the network of at least one limited node, said limited node being able to receive data only within time periods;

at the maintenance entity, (1b) determining that an update of a network configuration parameter value is required, said network configuration parameter being common to the at least one limited node and to the plurality nodes of the network;

at the maintenance entity, (1d) triggering delivery of the updated network configuration parameter value to the limited device;

(1e) carrying out the method of the first aspect of the invention.

In accordance with a third aspect of the invention, it is proposed a radio node comprising configuration means for configuring a limited node in a network, said limited node being able to receive data only within limited reception opportunities, the radio node comprising:

detection means for detecting that an update of a network configuration parameter value for the limited node is required;

a controller for deciding on whether to change a limited node behaviour based at least partly on communication characteristics of the limited node, said change of behaviour including increasing reception opportunity at the limited node;

the controller being arranged for triggering delivery of a request of behaviour change to the limited node during a reception opportunity after deciding to change the behaviour of the limited node and the updated network configuration parameter value during a subsequent reception opportunity of the limited node.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIGS. 3A and 3B are block diagrams showing a proposed format for a new command frame used in an embodiment of the invention.

DETAILED DESCRIPTION OF THE INVENTION

Figure 1:
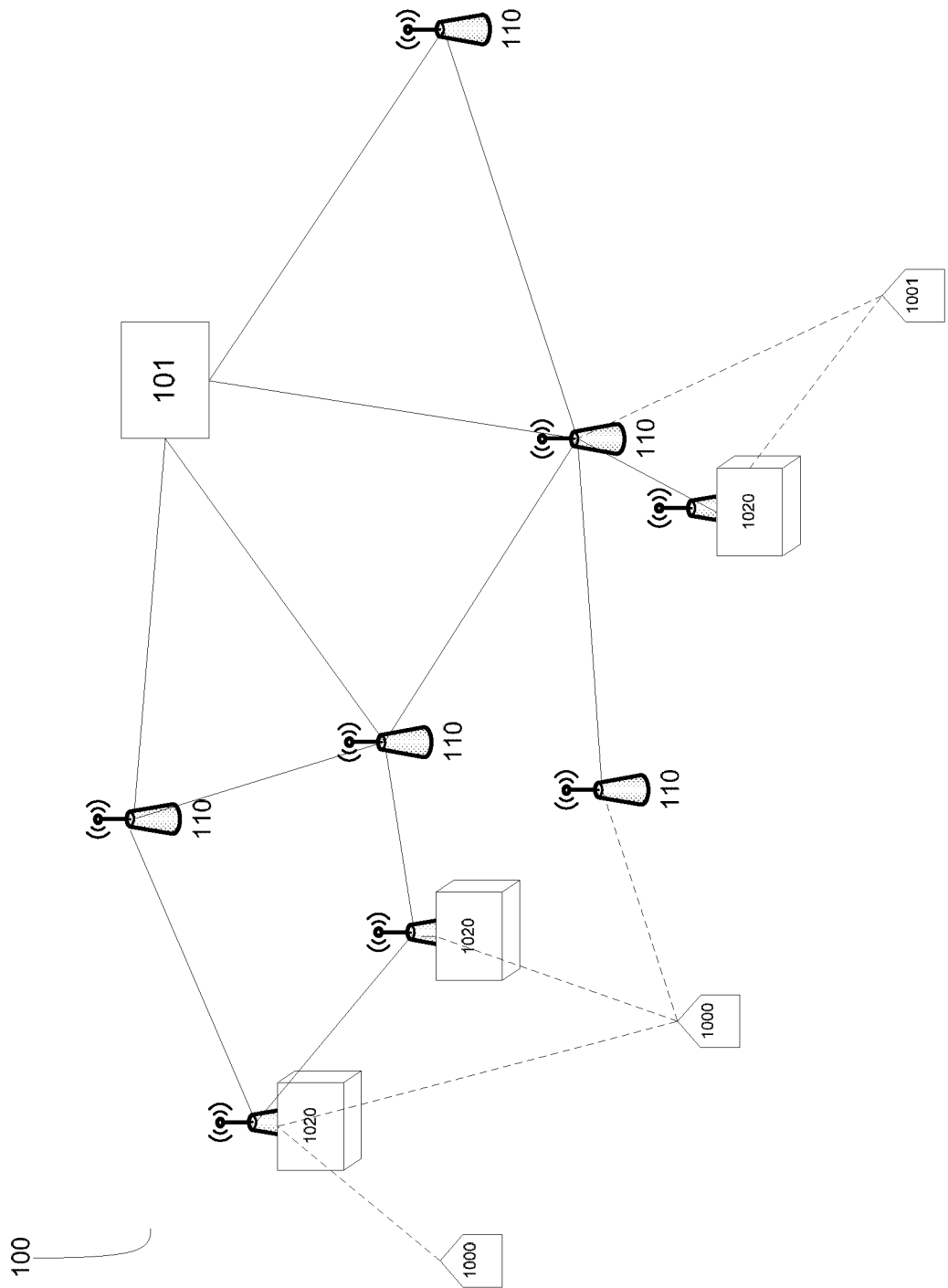
FIG. 1 is a block diagram of a network in which a first embodiment of the invention is implemented.

The present invention relates to a network comprising a plurality of nodes communicating one with another and to a method for configuring a limited device in a network. Such limited devices have for example limited energy supply means. Such devices may be used in a network where other devices do not have the same limitations. In an exemplary embodiment of the invention, the network is a wireless mesh network. The invention will be described in the context of the ZigBee standard and more specifically the ZigBee Green Power (ZGP) standard, where the limited devices are ZigBee Green Power Devices (ZGPD).

Such a ZGPD may be for example an energy harvesting device, for instance a switch, which converts the mechanical energy of the actuation of the switch by a user into electrical energy. After being actuated, the switch can transmit a limited number of packets and uses the remaining energy to receive data packets from other nodes in the network. The reception opportunities for such ZGPD are very short, and unpredictable in operation, since they are the direct result of the actuation by the user and the amount of energy harvested then.

Another kind of ZigBee Green Power Device is a sensor node which converts the environment energy into electrical energy for operation. For example, such a sensor node may be a light sensor which operates only when it receives sufficient light. Similarly, other sensors can be used like temperature or heat sensors powered by a thermoelement, flow sensor powered by the flow, power sensors powered by the electro-magnetic radiation, or acoustic sensors for determining the presence of a user.

According to ZigBee Green Power specification, a ZigBee Green Power Device, if it has sufficient energy budget, can (at selected times) receive a message for a limited time just after it has sent a message (in case of a switch, the energy for both receiving and sending comes from one and the same button push). The ZigBee Green Power Device indicates the reception capability in a regular frame it sends (upon user/sensor/application trigger), by setting an RxAfterTx flag. 5 ms after this transmission, the ZGPD opens its radio for reception, for at least 0.576 ms. This reception opportunity does not usually last much longer.

A ZGPD in operational mode does not know to expect a parameter update, so it may reserve only a minimum amount of energy for the reception. As a result, in case of a configuration command requiring a long update frame, for example a ZGPD Commissioning Reply frame carrying a security key (of 16 Bytes), such long frame cannot be processed accordingly, e.g. received in its full length, or the provided content stored in the non-volatile memory.

Accordingly, it is proposed, in accordance with the current definition of the invention, a method for configuring these special limited nodes. In particular, such method may require a particular ZigBee Green Power Device command to change the normal operation mode of the limited node into a "parameter reception mode". Such parameter reception mode includes a special behaviour of the ZGPD for transmission and/or reception, to improve the chances the update is received by the ZGPD.

When a parameter update is pending for a ZGPD, a ZGPD "Update Pending" command can be sent first, depending on the criteria such as the priority of the updated network configuration parameter, length of an updated network configuration parameter frame, duration of the limited node reception opportunities, frequency of the limited node reception opportunities, capabilities of the limited node, application functionality of the limited node, location of the limited node, priority of the limited node. Such a command may be very short and may be transmitted repeatedly to increase the probability of reception. This command may be transmitted by a ZigBee Green Power infrastructure device—one/any ZigBee Green Power Sink paired (ZGPS) with the ZGPD, or any ZigBee Green Power Proxy (ZGPP) appointed as the TempMaster, ZigBee Green Power-capable device translating the ZGPD commands into regular ZigBee commands for forwarding to regular ZigBee nodes—to inform the ZGPD about the pending update. However, as will be detailed hereafter, the sending of the messages and the tracking of the progress of the update could also be done by any of the following devices/roles: a ZigBee maintenance device (ZigBee Trust Center, ZigBee Coordinator, Network Manager), a ZigBee Green Power Device maintenance device a Commissioning Tool, a concentrator, a gateway. In response, the ZGPD can modify its behaviour. Moreover, the command may be completed to influence the behavior modification in a desired way. While in the parameter reception mode, the ZGPD may send other commands than normal "data" frame, to avoid unnecessary confusion in the system on reception, and also to save energy for the reception. A good candidate is a ZGPD Channel Request command with both channel sub-fields set to the current operational channel as known to the ZGPD, or a ZGPD Success command.

As illustrated on FIG. 1, a first embodiment of the invention may be carried out in a ZigBee mesh network 100 comprising a Coordinator 101 and a plurality of radio nodes 110. In this example, the network 100 further comprises devices compliant with the ZigBee Green Power specification, like ZGPD switches 1000 or ZGPD sensors 1001 which are paired with ZigBee Green Power Sinks (ZGPS) 1020 or with ZigBee Green Power Proxies (not shown). A ZGPS may be an actuator device which can be controlled by one or more ZGPD switches 1000 or sensors 1001. For example, ZGPSs are lamps. It is common that a plurality of ZGPSs is controlled by a single ZGPD, especially in the case of lighting. The ZGPSs being usually connected to the electrical mains, usually are not limited in reception or transmission opportunities, as opposed to the ZGPD which can receive only within unpredictable reception opportunities. To avoid collisions in the communication between the ZGPDs 1000 or 1001 and the ZGPSs 1020, a proxy or a sink TempMaster 1021 may be appointed to communicate with the ZGPDs.

In accordance with the first embodiment of the invention, a ZGPS 1020 which is aware of the update requirement communicates with a remote TempMaster 1021. The process is fully transparent to the selected TempMaster, which may simply (i) store the GPDF in its zgpTxQueue, to be transmitted to the ZGPD as instructed by ZGPS and (ii) send the GPDF (Green Power Device Frame), if any in their zgpTx-Queue, upon reception of a GPDF from the ZGPD.

Figure 2:
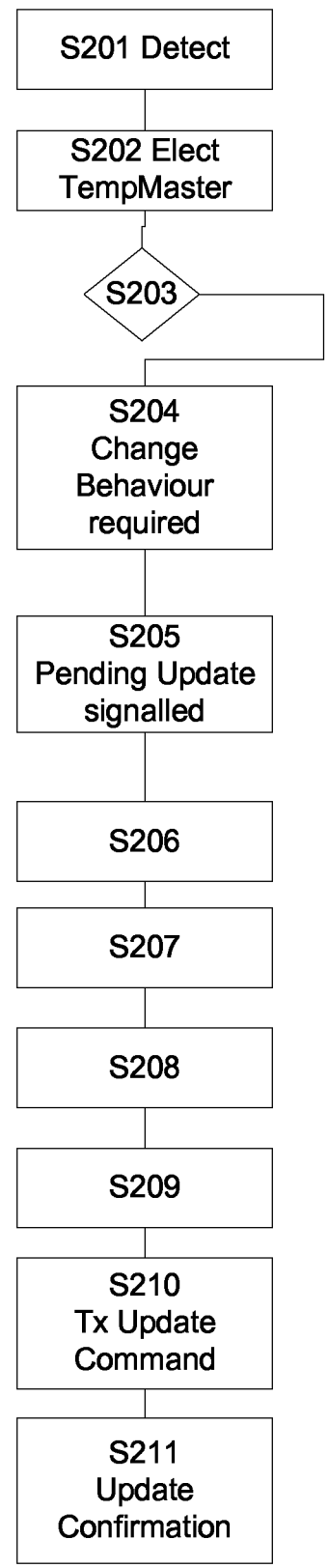
FIG. 2 is a flowchart depicting a method in accordance with the first embodiment of the invention.

This method will be illustrated by reference to the flowchart of FIG. 2.

At step S201. A ZGPS 1020 paired with a ZGPD 1000 learns about a pending parameter update e.g. by receiving ZGP Response or ZGP System Maintenance Warning.

At step S202. The ZGPS 1020 may nominate a TempMaster or initiate TempMaster election. The TempMaster is chosen from among the plurality of ZGPSs, including itself and the available forwarding proxies in the radio range of the ZGPD and capable of communicating with the ZGPD. The chosen will act as a TempMaster for the ZGPD 1000.

At step S203. The ZGPS 1020 may determine whether it is required or preferable to change the operation mode of the ZGPD for carrying out the update of configuration parameter. This decision may be taken in dependence on the current capabilities of the ZGPD and some parameters linked to the update command, like the length of the update command frame, its priority. The trigger to change the operation mode of the ZGPD may also be external (e.g, included in the received ZGP Response or ZGP System Maintenance Warning as described later herein in the complementary solution).

At step S204. The ZGPS 1020 may send a ZGP Response to the TempMaster, with a ZGPD Update Pending command frame. Some sub-options may be set accordingly.

For example, the following suboptions may be signalled:

Extend Rx Window to increase the reception opportunity duration. It may be set if the update frame is longer than the minimum Rx frame defined by the ZGP specification. In an example, if this suboption is selected, the ZGPD will stop sending normal data packets, and will only transmit short dedicated messages (e.g. ZGPD Channel Request command with both channel sub-fields set to the current operational channel as known to the ZGPD, or a ZGPD Success command) to indicate a coming reception opportunity after a predetermined time; moreover, in extension, a field carrying the exact length in bytes or in time duration of the pending update frame could be included in the ZGPD Update Pending command, to instruct the ZGPD more precisely how to behave. The ZGPD may thus react accordingly and extend its reception window.

Increase reporting frequency to more often create a reception opportunity. It may be set if the update time (e.g. as indicated by the ZigBee maintenance entity) is short; or depending on the number/reporting frequency of the ZGPD being updated at the same time, other processing in the network, etc. This increase in the reporting frequency may be more suitable for ZGPD sensors which can harvest energy in a more regular way, for example a temperature sensor, or light sensor. As above, the ZGPD may additionally prevent transmitting complete data packets in this operation mode to save energy for the reception opportunities, and transmit short dedicated messages to indicate a coming reception opportunity.

In extension, a field carrying the requested reporting frequency could be included in the ZGPD Update Pending command, to instruct the ZGPD more precisely, how to behave. That would require yet more intelligence in the receiving ZGPD.

ACK Request to request the ZGPD to acknowledge the received message. It may be set according to the update priority and the request of the maintenance entity as expressed in ZGP Response or ZGP System Maintenance Warning. It is to be noted that only some confirmation modes need to be propagated to the ZGPD. Moreover, it may not be required to send NACK in case of incorrect decoding of a received packet at the ZGPD for the sake of saving energy for the reception opportunities.

Enable channel toggling behaviour requiring the ZGPD to select the channel from the supported channel set for each subsequent transmission;

Enter commissioning mode which is an operation mode normally reserved for the initial configuration or maintenance;

Use special command for Tx, which requests the ZGPD to use a dedicated command (e.g. ZGPD Channel Request command with both channel sub-fields set to the current operational channel as known to the ZGPD, or a ZGPD Success command) for announcing the reception opportunities;

Enter/Exit the mode, which requests the ZGPD to switch to the special behaviour or switch back to the operational mode.

At Step S205. The TempMaster may place a ZGPD Update Pending command in its zgpTxQueue, and will attempt to deliver it in the next reception opportunity of the ZGPD. This reception opportunity is usually signalled by reception of the first GPDF with RxAfterTx set from this ZGPD.

At Step S206. Upon reception of the ZGPD Update Pending command, the ZGPD—if capable and the checks due upon reception succeed—modifies the update-related behaviour, as requested by the ZGPD Update Pending command and according to its capabilities. For example, ZGPD enters "parameter reception mode" (may require setting an internal variable to "parameter reception mode") or "commissioning mode"; for the ACK requests: it sets an internal variable to send upon reception of the new parameters a ZGPD Success using old/new parameters. Further, it can limit the number of retransmissions in a GPDF or the time between retransmissions of its own data packets (GPDF), or use the dedicated short GPDF to save more energy for the reception/storing of the new parameter. It may also change the reporting interval.

At Step S207. Upon delivering the GPDF, the TempMaster may send a confirmation to the ZGPS to indicate that the ZGPD is currently being updated. ZGP Notification with the GPDF Delivered sub-field of the Options field to 0b1 may be used.

At Step S208. Upon reception of the confirmation from the TempMaster, the ZGPS creates the ZGPD update frame (ZGPD Channel configuration/Commissioning Reply), and sends it to the TempMaster in the ZGP Response. The TempMaster may place the ZGPD command in its zgpTx-Queue. As a variant of this embodiment, the Update Frame may also have been transmitted together with the Update pending command Frame.

At Step S209. Upon its next transmission, in the "parameter reception mode", the ZGPD may preferably send a ZGPD Channel Request with the channel numbers for the future transmissions included in the sub-fields of the Channel toggling behaviour field. It is to be noted that the ZGPD Channel Request is used here as a kind of "dummy" packet to trigger communication from the TempMaster (without confusing the system with Data GPDFs). Moreover, especially in case when channel toggling was requested, the ZGPD can indicate in reply to the dummy packet the subsequent channels it will receive on, thus allowing the proxy to adjust its Tx channel and the packet to be delivered. Another format for the "dummy" packet could be used as well.

At Step S210. Upon reception of the GPDF from the ZGPD, the TempMaster sends the ZGPD update command. Then, it may send a confirmation to the ZGPS (e.g. a ZGP notification).

At Step S211. Depending on the ACK parameter value, the ZGPS considers the update successfully performed:
 a. If NO ACK: Upon transmitting ZGP Response with ZGPD update command;
 b. If SENT: On reception of ZGP Notification with ZGPD Channel Request;
 c. If ACK: when ZGPD sends ZGPD Success command;
 d. If "ZGPD using the param" ACK (and channel was updated), continue as follows (S212-S214).
 e. If "ZGPD using the param" ACK (and PANId/key was updated), continue as follows in S215-S218.

At Step S212. The ZGPS may send a ZGP Response, preferably without a ZGPD command, or with a dedicated "dummy" ZGPD command (e.g. ZGPD Update Pending command with the Enter/Exit sub-field set to "Exit") and instructing the TempMaster to listen on the NEW operational channel (as indicated in the TempMaster Tx channel field/ZGPP Tx channel field of the ZGP Response command) for some communication from the ZGPD.

At Step S213. On reception of this ZGP Response, the TempMaster switches to the channel indicated by the ZGPS, and starts a timer. Once it receives a GPDF from this ZGPD (and the checks due upon reception succeed), it immediately switches back to the old operational channel and sends ZGP Notification there.

At Step S214. ZGPS considers the update successful, if it receives ZGP Notification carrying ZGPD Success.

At Step S215. The parameter being updated has to be temporarily modified on the TempMaster Proxy:
 a. if it is the PANId, it can be temporarily overwritten with the new value. Or preferably the TempMaster can be temporarily put in promiscuous mode.
 b. If it is the key, the ZGPD key attribute can be overwritten temporarily. Or preferably, the new key can be stored in the Alternate ZGPD Key attribute.
 c. If special credentials (key, address) are required to perform such an update on the ZGPP, the ZGPS can inform the right maintenance entity, to let it perform the update first, before steps S216-218 are performed. It can be done as soon as in step S202, and at the latest in step S216.

At Step S216. ZGPS sends a ZGP Response, preferably without a ZGPD command, or with a dedicated "dummy" ZGPD command (e.g. ZGPD Update Pending command with the Enter/Exit sub-field set to "Exit"), and instructing the TempMaster to deliver it on the operational channel.

At Step S217. On reception of this ZGP Response, the TempMaster starts a timer. If it receives a GPDF from the ZGPD (and the checks due upon reception succeed), it sends the ZGP Notification with the received GPDF to the ZGPS.

At Step S218. ZGPS considers the update successful, if it receives a ZGP Notification with ZGPD Success.

At Step S219. Once the update is successfully performed (according to the required criteria), the ZGPS—if requested, and in requested mode—may send the confirmation to the maintenance entity in an example of implementation.

In a variant of this embodiment, to make sure this method works also in centralized setting (with ZigBee/ZGPD maintenance entity triggering the process), the maintenance entity may need to make sure the confirmations get delivered to itself such that it can plant the next GPDF in the TempMaster.

This could be done by the maintenance entity (temporarily) becoming member of the ZGPD managed group [i.e. adding the group to its APS list, for the appropriate endpoint], if any, or temporarily adding at the TempMaster a unicast pairing to its own address, such that it receives the ZGP Notifications. Also, ZGP Parameter Update Status commands could be set.

In such a setup, the device triggering the parameter update (ZigBee/ZGPD maintenance entity) may also provide the settings for the ZGPD Update Pending command, either by sending the command to the TempMaster/sink, or by including them in the trigger command (ZGP Response or ZGP System Maintenance Warning).

In a second embodiment, more decisions are taken at the TempMaster which can be a "smart" ZGPP/ZGPS/ZGPC.

At step 1. ZGPS paired with a ZGPD learns about pending parameter update (e.g. by a method described later herein in the complementary solution, i.e. by receiving ZGP Response or ZGP System Maintenance Warning).

At step 2. It may nominate a TempMaster (from itself, other sinks and available forwarding proxies in the radio range of the ZGPD and capable of communicating with the ZGPD). In this example, it will be assumed that the ZGPS picks itself as a TempMaster At step 3. It generates a ZGPD Update Pending command, and its suboptions set accordingly.

For example:
 Extend Rx Window—is set if the update frame is longer than the minimum Rx frame defined by the standard;
 Increase reporting frequency—is set if the update time (e.g. as indicated by the ZigBee maintenance entity) is short;
 ACK—may be set according to the update priority and the request of the maintenance entity;
 Enable channel toggling behaviour requiring the ZGPD to select the channel from the supported channel set for each subsequent transmission;
 Enter commissioning mode which is an operation mode normally reserved for the initial configuration or maintenance;

Use special command for Tx, which requests the ZGPD to use a dedicated command (e.g. ZGPD Channel Request command with both channel sub-fields set to the current operational channel as known to the ZGPD, or a ZGPD Success command) for announcing the reception opportunities;

Enter/Exit the mode, which requests the ZGPD to switch to the special behaviour or switch back to the operational mode.

At step 4. TempMaster places ZGPD Update Pending command in its zgpTxQueue, and delivers it to the ZGPD upon reception of the first GPDF with RxAfterTx set from this ZGPD.

At Step 5. Upon reception of ZGPD Update Pending command, the ZGPD—if capable and the checks due upon reception succeed—modifies the update-related behaviour, as requested by the ZGPD Update Pending command and according to its capabilities. For example, ZGPD enters "parameter reception mode" (may require setting an internal variable to "parameter reception mode") or "commissioning mode"; for the ACK requests: it sets an internal variable to send upon reception of the new parameters a ZGPD Success using old/new parameters. Further, it can limit the number of retransmissions in a GPDF or the time between retransmissions of its own data packets (GPDF), or use the dedicated short GPDF to save more energy for the reception/storing of the new parameter. It may also change the reporting interval.

At step 6. Upon delivering the ZGPD Update Pending command, the TempMaster creates the ZGPD update frame (ZGPD Channel configuration/Commissioning Reply), and places it in its zgpTxQueue.

At step 7. Upon the next transmission, in the "parameter reception mode", the ZGPD may preferably send a ZGPD Channel Request with the channel numbers for the future transmissions included in the sub-fields of the Channel toggling behaviour field.

At step 8. Upon reception of the GPDF from the ZGPD, TempMaster sends the update command.

At step 9. As in the first embodiment, then, depending on the ACK parameter value:

a. If NO ACK/SENT: the ZGPS considers the update successfully performed b. If ACK (and the updated parameter was the channel), continue as follows (10).

c. If ACK (and the updated parameter was the PANID/key), continue (11)

At step 10. TempMaster goes to the new operational channel (as indicated by the ZGP Response or ZGP System Maintenance Warning command), and starts a timer. If no ZGPD Success command is received until timeout, it switches back to the operational channel and goes to step 6 again. ZGPS considers the update successful, if it receives a ZGPD Success command.

At step 11. The ZGPS changes its own configuration such that it can receive a ZGPD Success command using the new parameter a. if the new parameter is the PANId, the TempMaster's PANId can be temporarily overwritten with the new value. Or preferably the TempMaster can be temporarily put in promiscuous mode.

b. If the new parameter is the key, the ZGPD key attribute can be overwritten temporarily. Or preferably, the new key can be stored in the Alternate ZGPD Key attribute.

It can be done as soon as in step 2 (e.g. if the change allows for receiving both with old and new params, as the preferred options indicate above), and at the latest in step 12.

The ZGPS considers the update successful, if it receives a ZGPD Success command, At step 12. Once the update is successfully performed (according to the required criteria), the ZGPS—if requested, and in requested mode—sends the confirmation to the maintenance entity.

It is to be understood that the same behaviour as described here for TempMaster ZGPS can be performed by TempMaster ZGPP. However, the ZGPP would have to have understanding on the update process (according to the current ZGP specification, it only sends ZGPD commands generated by ZGPS or maintenance entity and tunnels commands received from ZGPD).

In a variant of these embodiments, the methods above may adapted to be carried out at a special entity, a maintenance for the ZigBee Green Power Devices (ZGPD-ME) that communicate either directly or through proxies with the ZGPDs.

In all of the embodiments above, the ZGPD may exit the special mode (parameter reception mode or commissioning mode, as requested by the ZGPD Update Pending command and supported by the ZGPD), either automatically upon update completion (reception of the new parameter and optionally providing the acknowledgement, if requested by ZGPD Update Pending command and supported by the ZGPD) or upon reception of the ZGPD Update Pending command with the Enter/Exit mode sub-field set to 0b0. In the latter case, said command needs to be sent to the ZGPD by the device triggering/executing the update (maintenance entity, sink, TempMaster). A ZGPD Update Pending command with the Enter/Exit mode sub-field set to 0b0 can also be sent at other times, to instruct the ZGPD to return to operational mode.

An example of an ZGPD Update Pending command frame format is illustrated on FIGS. 3A and 3B.

The ZGPD Update Pending command can be a payloadless command, to limit its length. On its reception, the ZGPD modifies its behaviour as it can.

In extension, the ZGPD Update Pending command can, as illustrated in FIG. 3A, include a field with number of subfields/flags, to modify the behaviour of the ZGPD in a specific way, as described in the first and second embodiment above. On its reception, the ZGPD modifies its behaviour as it can, taking into account the values in the command.

The Enter/Exit mode, if set to 0b1, indicates that the ZGPD shall—if capable—leave the operational mode and enter the special update mode—either the parameter reception mode, if supported, or the commissioning mode, if supported—if the Enter Commissioning Mode sub-field is set. If set to 0b0 the Enter/Exit mode indicates that the ZGPD switch back to operational mode.

The Extend Rx Window, if set to 0b1, indicates that the ZGPD shall—if capable—extend the duration of the reception window after the next ZGPD transmission beyond the minimum standard-defined duration of ZGPD. It then allows for accommodating for longer frames being sent to the ZGPD and/or for the TempMaster transmitting the frame to the ZGPD more than one time (to allow for reliable reception even in the case the first transmission is partly corrupt). To accommodate for that, the ZGPD—depending on its energy budget and capabilities—may need to shorten the transmission/limit the number of retries or send shorter frames.

The Increase Reporting Frequency, if set to 0b1, indicates that the ZGPD shall—if capable—temporarily increase its reporting frequency. To accommodate for that, the ZGPD— depending on its energy budget and capabilities—may need to shorten the transmission/limit the number of retries.

The ACK Required, indicates whether the TempMaster requests the ZGPD to confirm the reception of the new parameters. It can take the following values
00—no ACK
01—ACK sending ZGPD Success command using the old parameters (postponed parameters switching);
10—ACK sending ZGPD Success command using the new parameters (immediate parameters switching)
11—reserved.
The values can be defined by the device controlling the ZGPD update process (sink/TempMaster/maintenance entity) or can be derived from the command triggering the parameter update process, e.g. the extended ACK Request from the ZGP Response or ZGP System Maintenance Warning command.

The Enable Channel Toggling Behavior, if set to 0b1, indicates that the ZGPD shall—if capable—select the channel from the supported channel set for each subsequent transmission.

The Enter Commissioning Mode, if set to 0b1, indicates that the ZGPD shall—if capable—switch to commissioning mode.

The Use Special Command For Tx, if set to 0b1, indicates that the ZGPD shall—if capable—use a dedicated command (e.g. ZGPD Channel Request command or a ZGPD Success command) for indicating the additional receptions opportunities in the special mode. The special command is preferably sent once, or can be retried as defined for regular GPDF.

In extension, the ZGPD Update Pending command can include additional fields with additional information, e.g. the exact duration of the requested reception window or the exact reception frequency/time spacing between reception opportunities, the identifier of the special ZGPD command used to announce the additional reception opportunities. The presence of those fields may preferably be indicated by the corresponding sub-field of the Options field set to 0b1.

Moreover, it is to be noted that the previous embodiments may combined with some other aspects relative to the configuration of the whole network. Indeed, even though the previous embodiments where focussed on the configuration of the limited devices, it may happen that such a configuration does not only relate to the ZGPD but to all the nodes of the network.

Indeed, in ZigBee networks, the configuration parameters, such as key, channel, PANId, etc., may need to change for the complete network. ZGPD with their very limited energy budget are neither guaranteed to receive the update before it takes effect, nor capable to discover the change and self-adjust. If the ZGPDs are not updated in time, this may require manual re-commissioning, which is time-consuming, manually-intensive due to limited communication and User Interface (UI) capabilities of the ZGPD, and also invalidates the major claim of energy-harvesting ZGPDs: their maintenance-free operation.

The complementary solution that can be combined with the previous embodiments provides efficient and reliable delivery of changed network parameters to ZGPD operating in ZigBee networks. To this end, ZGP infrastructure devices, i.e. ZigBee devices which are capable of communicating with ZGPD according to the ZGP standard, are informed about the planned parameter change in advance by the responsible ZigBee maintenance entity, e.g. Trust Centre, ZigBee PAN Coordinator or Network Manager, such that they have time to update the ZGPDs. Once the update is performed, the ZGP infrastructure device can provide the responsible ZigBee maintenance entity with the update status response. New frame ZGP formats and frame extensions are defined for that purpose.

According to the ZigBee specification, ZigBee document 053474r19, "ZigBee specification", revision 19, Oct. 12, 2010, section 4.6.3.4, the security key update is done in a 2-message approach. With the first message, the key is distributed to all ZigBee devices in unicast or broadcast. With the second message, the devices shall switch to using the new key.

According to the ZigBee specification ZigBee document 053474r19, "ZigBee specification", revision 19, Oct. 12, 2010, section 3.10 and Appendix E, the channel and PANId updates are performed via a broadcast from the Network Manager/ZigBee PAN Coordinator device. A fixed time after reception of this message (nwkNetworkBroadcastDeliveryTime, corresponding to a couple of seconds in ZigBee-PRO networks), each device switches to the new configuration.

A drawback is that these mechanisms do not provide enough time for the ZGP infrastructure devices to forward the new parameter to the ZGPD. Furthermore, they do not allow for providing any feedback to the managing ZigBee entity as to how many and which ZGPDs were updated, and thus makes the after-update maintenance including manual re-commissioning yet more cumbersome. Specifically for the key updates, simply writing the new value to the zgpSharedSecurityKey attribute implemented by all ZGP infrastructure devices does not allow for a clear ZGPD update control process.

The present solution proposes to define a new capability on the ZigBee maintenance entity, to be aware of the presence of ZGPD devices in the network and to manage the ZigBee parameter process accordingly. To this end, once the decision on parameter change has been taken and the presence of the ZGPD in the network has been detected, the ZigBee maintenance entity postpones the ZigBee update. Instead, it triggers the ZGPD parameter update process first. It has the means for collecting the status responses from the ZGP infrastructure devices, and for determining the time of performing the ZigBee update based on some criteria, including the ZGPD update progress. To this end, the present solution defines new ZGP commands or extends existing ones. To allow for the dual-key operation in ZGP, an additional AlternateKey ZGP attribute is proposed.

According to the ZGP specification as defined in ZigBee Document 095499, "Draft ZigBee Green Power Specification", version 0.9, revision 16, May 16, 2011, a ZGPD, if it has sufficient energy budget, can, at selected times, receive a message for a limited time just after it has sent a message. In case of a ZGPD switch, the energy for both receiving and sending comes from one and the same rocker toggling by the user. Because of their energy budget limitations, those devices are also not able to discover the new parameters via an active search. The ZGPD indicates the reception capability in the regular frame it sends, upon user or sensor or application or time or harvester/energy storage trigger, by setting an RxAfterTx flag. Five (5) ms after this transmission, the ZGPD opens its radio for reception, for at least 0.576 ms and usually not much longer. Because of this very time-constrained mechanism, the senders do not use carrier-sense multiple access with collision avoidance (CSMA/CA), not to waste the transmission opportunity. Thus, it is crucial that only one device is transmitting to the ZGPD, otherwise, the multiple transmissions will collide with probability close to 1. For it, the ZGP specification defines TempMaster election procedure, such that a sink controlled by the ZGPD selects one device from the proxies forwarding on behalf of this particular ZGPD and itself, if it is in radio range of the ZGPD, by using the criteria of distance to originating ZGPD and the ZGP infrastructure device's short address. However, this mechanism lacks the TempMaster resolution between multiple sinks controlled by the same ZPGD, especially if they appoint themselves as the TempMaster. The present solution proposes to change the TempMaster election procedure, and the ZGP Response frame to accommodate for that.

In addition, the current TempMaster/FirstToForward proxy election may be performed immediately upon reception of ZGPD command frame with the RxAfterTx sub-field set. However, neither the address of the selected TempMaster nor the information if the sink is in direct radio range of the ZGPD is currently stored in the sink. Buffering the update frame until the next interaction with the ZGPD, to first determine the TempMaster and then prepare the ZGPD update frame introduces additional delay, and thus may lead to reduced update success rate. Therefore, an ad-hoc frame delivery to the ZGPD, e.g. like one triggered by ZigBee parameter update, is difficult to perform. To cope with this, it is proposed to store TempMaster related information in the sink. Specifically, it is proposed for the sink to store additionally the following information on each (RxAfterTx-capable) paired ZGPD:
 (i) InRange flag—indicating if the sink was capable of receiving directly from the ZGPD and
 (ii) TempMaster field—indicating the last elected TempMaster or the current first to forward proxy.
 (iii) TempMaster Distance field—indicating the distance to the TempMaster, also if it is the sink itself. These items can be stored in the Sink Table entry or separately; all or only some of them, as mandatory or optional items.

In order to perform the ZGPD update, the ZigBee maintenance entity has—in addition to the functions defined by the ZigBee specification—the following functions:
1) It knows if ZGP devices are used in the system.
2) It includes a policy to postpone the ZigBee parameter update to provide additional update opportunities for ZGPD.
 (i) According to an embodiment, it has the knowledge if any of the ZGPDs are or are not capable of reception. In addition, the ZigBee maintenance entity can know how many ZGPDs in the network are capable of reception, and also which ZGPDs have this capability. Alternatively, if it does not have capability to discover/information on the ZGPD reception capabilities, the ZigBee maintenance entity can leave the decision as to which ZGPD to try to update to the ZGP infrastructure devices. They can do so by checking for the RxOnCapability of this ZGPD. This differentiation is preferably done as early as possible in the update process, to limit the traffic and/or the delay associated with the update.
 (ii) If the ZigBee maintenance entity is capable of maintenance of the NWK key for ZGPD, it preferably will know if the key used to secure ZGPD communication is derived from the ZigBee NWK key being updated, and thus, if updating the ZGPD and postponing the ZigBee parameter update is required. Alternatively, if it does not have capability to discover/information on the ZGPD security key type used (by particular ZGPD), the ZGPD maintenance entity/ZGP infrastructure devices make this decision, by checking for the security key type used (by a particular ZGPD). This is done as early as possible in the update process, to limit the traffic.
 (iii) If the ZigBee maintenance entity is capable of maintenance of the PANId, it preferably will know, if any of the ZGPD uses the PANId value (rather than the default broadcast PANId value of 0xffff), and thus, if updating the ZGPD and postponing the ZigBee parameter update is required.
 (iv) The postponing may be dependent on the type of parameter updated and the ZigBee method of updating it. In one example, both the delivering of the new parameter to the ZigBee nodes, and the activation of the new parameter can be postponed. In another example, only the activation of the new parameter can be postponed; that's possible for the ZigBee Network Key update.
3) It may have a policy of triggering the ZigBee parameter update depending on the progress of ZGPD update. The policy criteria are up to the ZigBee maintenance entity vendor, the application profile using it, or the administrator of a particular network and can include:
 (i) giving ZGPD fixed amount of additional time for update
 (ii) all ZGPDs of a given subset updated, e.g. based on their functionality, location, capability
 (iii) given percentage of (a subset of) ZGPD updated.
4) The ZigBee maintenance entity has the capability of triggering a ZGPD update, by sending:
 (i) a ZGP System Maintenance Warning command;
 (ii) And/or a ZGP Response command—modified as proposed hereafter;
5) Optionally, the ZigBee maintenance entity has the capability of appointing a TempMaster for ZGPD.
6) Optionally, it has the capability of tracking the progress of the ZGPD update, by reception of the ZGP Update Status command. It can request/suppress the update confirmation via appropriate setting in the update triggering command.
7) Further, the ZigBee maintenance entity may be able to present the update results to the user (e.g. network administrator), for example as a sitemap, indicating the location of the ZGPDs requiring manual update.
8) Optionally, the ZigBee maintenance entity is capable of re-triggering the update process for selected ZGPDs after the parameter update became effective in the ZigBee network, e.g. in case of a channel update by re-sending ZGP Response command to a selected TempMaster, instructing it to temporarily move to the old operational channel.

All the above-mentioned functions can be performed by the actual responsible ZigBee maintenance entity (Trust Centre, ZigBee PAN Coordinator, Network Manager). Alternatively, only functions 1 and 2 are implemented in the ZigBee maintenance entity, and the actual ZGPD update and update progress tracking can be delegated to and performed by another entity, ZGPD maintenance entity, more knowledgeable about ZGPD (e.g. central controller or concentrator, a ZGP commissioning tool, etc). The ZGPD maintenance entity can be a separate device or a separate module/role of the ZigBee maintenance entity.

A first example of this solution is a channel update with semi-centralised TempMaster election. The pre-requisites are that the ZigBee maintenance entity (ZigBee Network Manager or ZigBee PAN Coordinator in this case) is aware about the ZGPD presence in the network and that, for each RxAfterTx-capable ZGPD, at least one ZGPS controlled by that ZGPD is known to the ZigBee maintenance entity (e.g. as a result of commissioning or based on the planning, group assignment, or based on reading out sink tables). It further has some policy criteria when to perform the ZigBee parameter update (e.g. the ZGPD TimeOut elapsed, or given percentage of a given subset of ZGPD was successfully updated).

In a first step, the ZigBee maintenance entity sends ZGP System Maintenance Warning commands to a selected set of sinks. The ZigBee maintenance entity has determined the set of sinks and the ZGPD lists for these sinks in such a way that each RxAfterTx capable ZGPD occurs in the ZGPD list of exactly one transmitted ZGP System Maintenance Warning command. The Parameters presence sub-field indicates that the New Channel field is present. The NewChannel field indicates the value of the new operational channel. The Perform TempMaster election sub-field is set to 0b1. The AckRequest sub-field is set according to the update policy criteria of the ZigBee maintenance entity.

In a second step, each sink receiving a ZGP System Maintenance Warning command performs two substeps of determining the TempMasters and creating ZGPD Channel Configuration command, whereby the order of performing them is irrelevant. Optionally, each sink checks the RxOnCapability of every ZGPD in the ZGPDList field, and selects for update only those, for which it is TRUE. Each sink determines the TempMaster for each of the to be updated ZGPDs.

It has to be noted that a sink may select another sink to become TempMaster, if the first sink has the means of determining that the selected TempMaster sink is in the range of the ZGPD (and optionally also paired to it).

For each to be updated ZGPD, the sink receiving the ZGP System Maintenance Warning command creates a ZGPD Channel Configuration command according to the ZGP specification with the value of the Operational Channel subfield of the Channel field set to the value of the NewChannel field from the ZGP System Maintenance Warning command. If the selected TempMaster is another device (proxy or sink), the sink sends a ZGP Response command. The value of the Ack Request subfield and other relevant (sub-)fields of the ZGP Response command are set to the value of the corresponding (sub-)field in the ZGP System Maintenance Warning command. The Priority ZGPD command subfield is set to 0b1. TimeOut field has a value equal to the Update time field in the ZGP System Maintenance Warning command. The ZGP Command ID and ZGPD Command Payload field have the values as determined above.

In a third step, each TempMaster places the ZGPD command for the ZGPD in its zgpTxQueue, according to the priority bit, i.e. if there is already an entry for this SrcID in the zgpTxQueue, it is replaced with the current ZGPD Channel Configuration command, whether the old message had the priority bit set or not. If the sink itself is TempMaster, it acts as if it received a ZGP Response command with the Priority ZGPD command subfield set to 0b1.

In a fourth step each ZGPP and ZGPS that is the temp master for some ZGPD sends the ZGPD command to each ZGPD for which it is a temp master whenever it has an opportunity to do so and less than TimeOut ms have elapsed since reception of the ZGP Response command/ZGP System Maintenance Warning command.

In a fifth step, if the Ack Request subfield has value 0b1, the temp master informs the ZigBee maintenance entity whenever it has sent the ZGPD Channel Configuration command to the ZGPD, by sending the ZGP Parameter Update Status command with the appropriate update status value.

In a sixth step, when its policy criteria for the update are fulfilled, the ZigBee maintenance entity triggers the ZigBee parameter update. The ZGP infrastructure nodes follow the ZigBee protocol in their ZigBee roles. At the latest when starting using new parameters, the undelivered priority entries may be removed from the zgpTxQueues.

Other variants of this example are possible, with centralised proxy election process (a Coordinator, or the maintenance entity takes care of the election) or a distributed proxy election process (the sinks related to the ZGPD automatically elects a proxy).

In all of these examples, in accordance with the embodiments of the invention, it is proposed to have a request of behaviour change through a parameter update operation mode at the limited node.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A method for configuring a limited node in a network, said limited node being able to receive data only within limited reception opportunities, the method comprising at a first node:
   (a) detecting that an update of a network configuration parameter value for the limited node is required;
   (b) in response to the detecting, deciding on whether to change a limited node behaviour from a first behaviour based at least partly on communication characteristics of the limited node, said change of behaviour including increasing reception opportunity at the limited node by restricting a size of a message transmitted by the limited node;
   (c) depending on the decision at step (b), triggering delivery of a request of behaviour change to the limited node during a first reception opportunity of the limited node; and
   (d) triggering delivery of the updated network configuration parameter value to the limited node during a second reception opportunity of the limited node.

2. The method of claim 1, wherein the change of behaviour includes an increase of the duration of the limited node reception opportunities.

3. The method of claim 2, wherein step (d) includes transmitting the updated network configuration parameter value in a configuration frame, and wherein the request of behaviour change of step (b) includes a duration indication based on the length of the configuration frame.

4. The method of claim 1, wherein the change of behaviour includes a change in the frames being sent to indicate the reception opportunities by the limited node.

5. The method of claim 1, wherein the change of behaviour includes the limited node starting to send acknowledgements upon correct reception of a data packet.

6. The method of claim 1, wherein the change of behaviour includes the limited node transmitting on multiple channels from a supported channel set to indicate the reception opportunities.

7. The method of claim 1, wherein the decision of step (b) is also based on at least one of the following criteria: priority of the updated network configuration parameter, length of an updated network configuration parameter frame, duration of the limited node reception opportunities, frequency of the limited node reception opportunities, capabilities of the limited node, application functionality of the limited node, location of the limited node, priority of the limited node.

8. The method of claim 7, wherein the network configuration parameter value includes at least one of a channel identifier, a security key, a security key type, a network identifier, a node identifier, a reporting interval, an operation mode, a maintenance entity identifier.

9. The method of claim 8, further comprising the step (e) of sending a request of behaviour change to the limited node for changing the behaviour of the limited node back to the first behaviour.

10. The method of claim 9, further comprising the step (g) of the limited node changing its behaviour back to the first behaviour after successful completion of the configuration of the limited node.

11. The method of claim 10, further comprising the step (f) of signaling to a maintenance entity the successful configuration of the limited node.

12. A method for configuring a network comprising a maintenance entity and a plurality of nodes, the method comprising, the steps of:
   at the maintenance entity, detecting a potential presence in the network of at least one limited node, said limited node being able to receive data only within limited time periods;
   at the maintenance entity, determining that an update of a network configuration parameter value is required, said network configuration parameter being common to the at least one limited node and to the plurality of nodes of the network;
   at the maintenance entity, triggering delivery of the updated network configuration parameter value to the limited device; and
   carrying out the method of claim 1.

13. The method of claim 12, further comprising, after the determining, at the maintenance entity, postponing a transmission of a signal for updating the network configuration parameter value at the plurality of nodes, based on the detection of the potential presence of the at least one limited node in the network.

14. The method of claim 12, further comprising, after the carrying out, at the maintenance entity, transmitting a signal for updating the updated network configuration parameter value at the plurality of nodes.

15. The method of claim 14, wherein the carrying out is performed after reception of the signal.

16. The method of claim 12, wherein the carrying out is performed by the maintenance entity.

17. The method of claim 12, wherein the carrying out is performed by a first node that is different from the maintenance entity.

18. The method of claim 1, wherein the restricting comprises reducing the size of the message transmitted by the limited node, wherein the reducing increases the limited node's available energy for receiving data.

19. A radio node for configuring a limited node in a network, said limited node being able to receive data only within limited reception opportunities, the radio node comprising:
   a detector for detecting that an update of a network configuration parameter value for the limited node is required;
   a controller for deciding, in response to the detecting, on whether to change a limited node behaviour based at least partly on communication characteristics of the limited node, said change of behaviour including increasing reception opportunity at the limited node by restricting a size of a message transmitted by the limited node;
   the controller being arranged for triggering delivery of a request of behaviour change to the limited node during a first reception opportunity in response to deciding to change the behaviour of the limited node and triggering delivery of the updated network configuration parameter value to the limited node during a subsequent reception opportunity of the limited node.

20. The radio node of claim 19, wherein the restricting comprises reducing the size of the message transmitted by the limited node, wherein the reducing increases the limited node's available energy for receiving data.

* * * * *